United States Patent
Little, Jr.

[11] Patent Number: 5,217,377
[45] Date of Patent: Jun. 8, 1993

[54] PAINT COLOR TESTING KIT AND METHOD

[76] Inventor: Frederick N. Little, Jr., 6609 Duvon Pl., Manassas, Va. 22111

[21] Appl. No.: 693,597

[22] Filed: Apr. 30, 1991

[51] Int. Cl.⁵ .................... G09B 19/00; B32B 35/00; B65D 73/00; B05C 13/00
[52] U.S. Cl. .................................... 434/103; 434/98; 434/105; 206/81; 206/223; 427/142; 427/140
[58] Field of Search .................... 40/124; 434/98, 103, 434/105; 206/81, 575, 569, 223; 427/141, 140

[56] References Cited

U.S. PATENT DOCUMENTS

| | | |
|---|---|---|
| 2,137,477 | 11/1938 | Haven . |
| 2,494,072 | 1/1950 | Vetterli . |
| 3,384,983 | 5/1968 | Olson . |
| 3,609,886 | 10/1971 | Vien . |
| 4,061,516 | 12/1977 | George et al. ....................... 427/140 |
| 4,379,696 | 4/1983 | Lerner . |
| 4,457,718 | 7/1984 | Lerner ................................. 434/98 |
| 4,523,852 | 6/1985 | Bauer . |
| 4,692,481 | 9/1987 | Kelly . |
| 4,702,968 | 10/1987 | Masuhara et al. ............... 427/409 X |
| 4,801,267 | 1/1989 | Von Loesch et al. . |
| 4,814,200 | 3/1989 | Propst ................................ 427/142 |
| 4,973,253 | 11/1990 | Shook et al. . |
| 5,077,086 | 12/1991 | Cavill ................................. 427/142 |
| 5,082,692 | 1/1992 | Cavill ................................. 427/142 |

Primary Examiner—Marianne Padgett
Attorney, Agent, or Firm—Frank P. Presta

[57] ABSTRACT

A kit and method for testing the color of paints to be applied to painted surfaces having primers or sealers thereon to determine if a paint color matches that of a painted surface. Preferably, the kit comprises a plurality of testing members removably mounted therein or thereon. The testing members have different primers or sealers thereon corresponding to those on different known painted surfaces. When a paint is to be applied to an area of a specific painted surface, the paint is first applied to one of the testing members having thereon the same primer or sealer as that on the painted surface. The painted testing member then is moved to a position adjacent the painted surface to compare the color of the paint on the testing member to that of the painted surface.

7 Claims, 1 Drawing Sheet

PAINT COLOR TESTING KIT AND METHOD

BACKGROUND OF THE INVENTION

The present invention relates to a paint color testing kit and method and, more particularly, to such a kit that can be used to substantially duplicate the surface on which the paint is to be applied so that an accurate color comparison can be made between paint applied to a testing member of the kit and the painted surface to be repaired.

In the repair of automobile bodies, for example, it is common practice to spray a small amount of paint on the repaired area to determine if it matches the paint on the surrounding undamaged area of the body. This procedure is often repeated many times before a proper color match is effected, resulting in a build-up of numerous layers of paint on the repaired area. These unnecessary layers of paint can adversely affect the appearance of the repaired area and will often result in the development of cracks in the repaired and painted surface because of excessive layers of paint thereon.

A need has arisen, therefore, for a simple and effective method of comparing the color of a paint to be applied to a repaired area of an automobile body or the like to the color of the surrounding undamaged area without the build-up of excessive paint on the repaired area. The paint color testing kit and method of the present invention meet this need.

SUMMARY OF THE INVENTION

In accordance with the kit and method of the present invention, a plurality of paint color testing members are provided which have different primers or sealers impregnated therein or coated thereon. The primers or sealers correspond to those used by different automobile manufacturers or to those of different paint manufacturers. When a repaired area is to be repainted, therefore, the paint to be used is first applied to one of the testing members having the primer or sealer thereon corresponding to that of the surface to be repainted. The painted testing member then is positioned adjacent to the painted surface surrounding the area to be repainted to determine a proper color match.

Because the testing member duplicates the primer or sealer on the painted surface, an accurate color match is easily effected without a build-up of any unnecessary paint on the surface to be repainted. The testing members can be provided in a kit form where of any suitable construction. Such a kit is simple in construction, easy to manufacture and inexpensive in cost.

DESCRIPTION OF THE PREFERRED EMBODIMENTS

Figure 1:
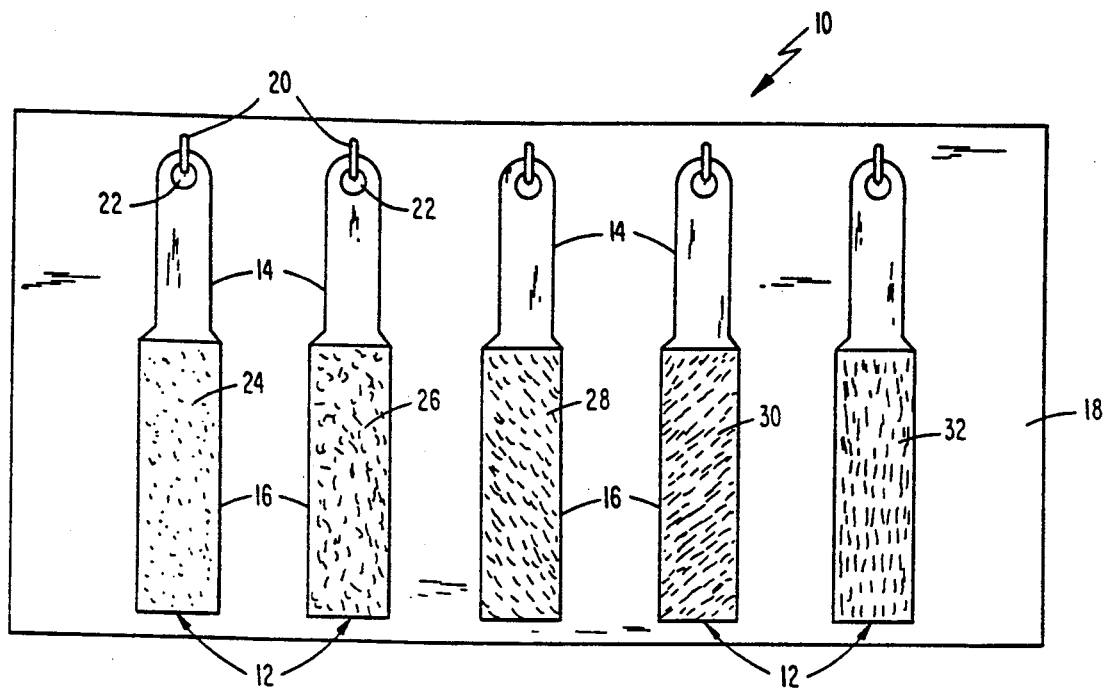
FIG. 1 is a front elevational view of a paint color testing kit constructed in accordance with the principles of the present invention.

Referring to FIG. 1, there is illustrated a paint color testing kit 10 constructed in accordance with the present invention. The kit 10 comprises a plurality of elongated testing members 12 of any suitable size, shape or construction, preferably having a handle portion 14 and a testing portion 16. The testing members 12 may be formed of any suitable material, such as plastic or wood.

The testing members 12 are removably mounted on or in a support device of any suitable construction such as the support panel 18 shown in FIG. 1 which has a plurality of hook members 20 or the like on which the testing members 12 are hung through the use of apertures 22 in the handle portions 14 thereof. In this manner, the testing members 12 can be easily stored in kit form and are readily identifiable and accessible for use. The testing members and/or the support panel may have indicia thereon for the purpose of identifying different testing members. The support panel 18 can be mounted on any suitable support means such as a wall (not shown) or the like.

In accordance with the principles of the present invention, the testing portions 16 of the testing members 12 have different primers or sealers 24, 26, 28, 30 and 32 impregnated therein or coated thereon. The primers or sealers 24-32 correspond, for example, to those used by different automobile manufacturers on their automobile bodies or to those of different manufacturers of paints for various purposes. The specific nature of the different primers or sealers on the testing members 12 would be determined by the use of the paint color testing kit 10, i.e., for paint to be applied to an automobile body or for paint to be applied to another surface in a different environment. The present invention, therefore, contemplates the use of different paint color testing kits to be used in different environments.

Figure 2:
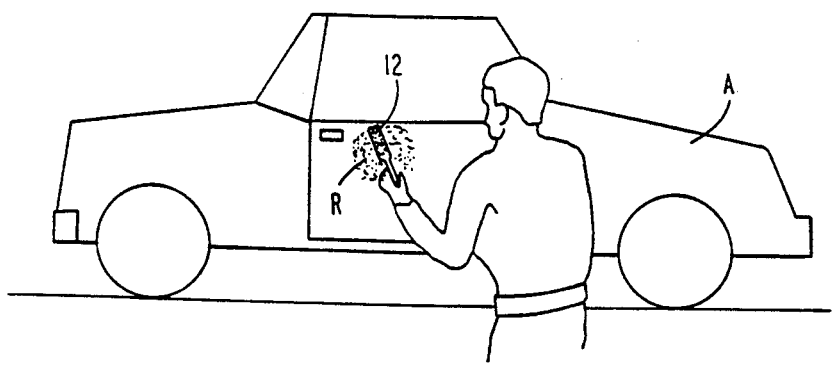
FIG. 2 is a side elevational view of an automobile in schematic form showing the use of a paint color testing member from the kit of FIG. 1 to properly match the paint to be applied to a repaired area of the automobile body to the paint on the surrounding area of the body.

In the practice of the method of the present invention, when a portion of a painted surface is to be repainted because of repair or the like the paint to be used is first applied to one of the testing members 12 having a primer or sealer thereon corresponding to that of the surface to be repainted. The painted testing member 12 then is positioned adjacent to the painted surface surrounding the area to be repainted to determine if the color of the paint on the testing member properly matches the paint on the painted surface. This is illustrated in FIG. 2 wherein the painted testing member 12, having the same primer thereon as the automobile body A, is positioned adjacent to the area of the body surrounding the repaired area R to determine if the new paint on the testing member properly matches the old paint on the automobile body.

It will be readily seen, therefore, that an accurate color match can be effected with the use of the present invention for the reason that the painted testing member 12 has the same primer or sealer thereon as that of the surface to be painted. Also, the color match can be effected without a build-up of any unnecessary paint on the area to be repainted.

While in accordance with the patent statute the preferred forms and embodiments of the invention have been illustrated and described, it will be apparent to those of ordinary skill in the art that various changes and modifications may be made without deviating from the inventive concepts set forth above.

What is claimed is:

1. A kit for testing the color of a first paint to be applied to a painted surface having a second paint and an underlying primer thereon to determine if the first paint color matches that of the painted surface, said kit comprising a plurality of testing members each having thereon as the outer coating a predetermined paint primer, each of said testing members being constructed to allow a selected first paint to be applied thereto to indicate the resulting color interaction between the selected first paint and said primer thereon such that a painted testing member with the same primer as that of the painted surface can be moved to a position adjacent the painted surface to compare the colors thereof, each of said testing members having a different predetermined primer thereon corresponding to those used on different painted surfaces.

2. The kit of claim 1 further comprising support means, said testing members being removably mounted on said support means.

3. The kit of claim 2 wherein said support means is a support panel having supporting hooks thereon, and said testing members have apertures for receiving said hooks therethrough.

4. The kit of claim 2 wherein said testing members are elongated and have handle portions thereon.

5. The kit of claim 1 wherein said testing members are of a size to be conveniently held in the hand of a user.

6. A kit for testing the color of a first paint to be applied to a painted surface having a second paint and an underlying primer thereon to determine if the first paint color matches that of the painted surface, said kit comprising a plurality of testing members each having thereon as the outer coating a different predetermined paint primer, each of the said testing members being constructed to allow a selected first paint to be applied thereto to indicate the resulting color interaction between the selected first paint and said primer thereon such that a painted testing member with the same primer as that of the painted surface can be moved to a position adjacent the painted surface to compare the colors thereof, and further including support means, said testing members being removably mounted on said support means, wherein said support means is a support panel having supporting hooks thereon, and said testing member have apertures for receiving said hooks therethrough.

7. A kit for testing the color of a first paint to be applied to a painted surface having a second paint and an underlying primer thereon to determine if the first paint color matches that of the painted surface, said kit comprising a plurality of testing members each having thereon as the outer coating a different predetermined paint primer, each of the said testing members being constructed to allow a selected first paint to be applied thereto to indicate the resulting color interaction between the selected first paint and said primer thereon such that a painted testing member with the same primer as that of the painted surface can be moved to a position adjacent the painted surface to compare the colors thereof, and further including support means, said testing members being removably mounted on said support means, and further wherein said testing members are elongated and have handle portions thereon.

* * * * *